(12) United States Patent
Hu et al.

(10) Patent No.: US 7,959,688 B2
(45) Date of Patent: Jun. 14, 2011

(54) METHOD FOR REMOVING AMMONIA NITROGEN FROM SOLUTIONS

(75) Inventors: Zhibin Hu, Wuhan (CN); Houtao Li, Wuhan (CN); Zhimin Wen, Wuhan (CN)

(73) Assignee: Wuhan Comeon Environment Engineering Co., Ltd., Wuhan (CN)

( * ) Notice: Subject to any disclaimer, the term of this patent is extended or adjusted under 35 U.S.C. 154(b) by 755 days.

(21) Appl. No.: 12/043,238

(22) Filed: Mar. 6, 2008

(65) Prior Publication Data

US 2008/0152571 A1 Jun. 26, 2008

Related U.S. Application Data

(63) Continuation of application No. PCT/CN2006/002359, filed on Sep. 12, 2006.

(30) Foreign Application Priority Data

Nov. 11, 2005 (CN) .......................... 2005 1 0019781

(51) Int. Cl.
*B01D 9/00* (2006.01)

(52) U.S. Cl. ..................................... 23/302 A; 23/293 R
(58) Field of Classification Search ................. 23/293 R, 23/295, 302 R, 302 AR
See application file for complete search history.

(56) References Cited

U.S. PATENT DOCUMENTS

2002/0159942 A1* 10/2002 Jessup et al. .................. 423/352
* cited by examiner

*Primary Examiner* — Edward M Johnson
(74) *Attorney, Agent, or Firm* — Matthias Scholl P.C.; Matthias Scholl

(57) ABSTRACT

Taught is a method for removing ammonia nitrogen from an ammonia-containing solution via atomization, comprising a) adjusting the pH of the ammonia-containing solution to above 10 by adding a base; b) after mixing, atomizing the ammonia-containing solution to produce an ammonia-containing mist so as to increase the gas-liquid interface and allow ammonia to transfer from the ammonia-containing mist to an ambient gas yielding a clean mist; and c) re-aggregating said clean mist. The method is applicable for treatment of liquids containing high, medium and low ammonia nitrogen concentration.

10 Claims, 7 Drawing Sheets

METHOD FOR REMOVING AMMONIA NITROGEN FROM SOLUTIONS

CROSS-REFERENCE TO RELATED APPLICATIONS

Figure 1:
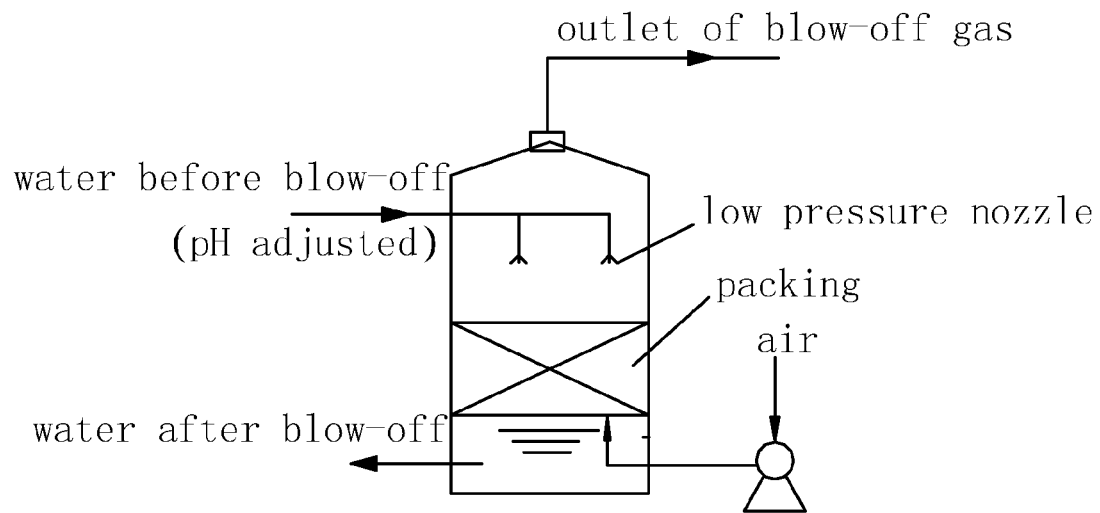
Figure 2:
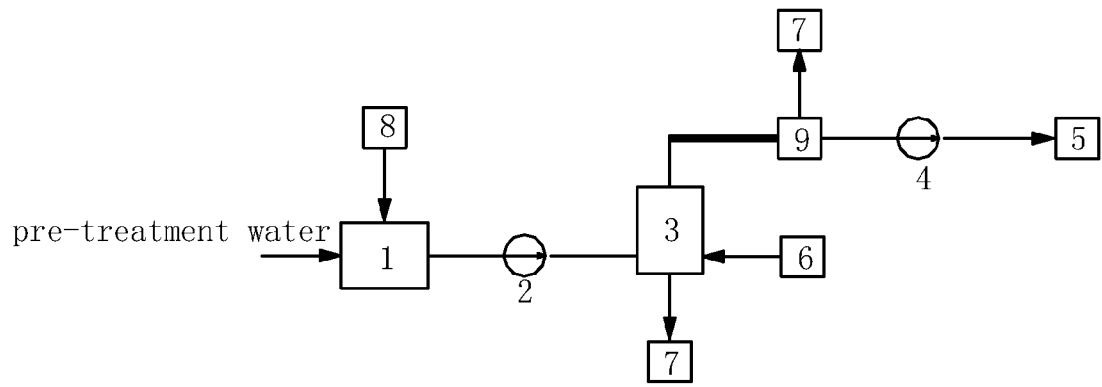
Figure 3:
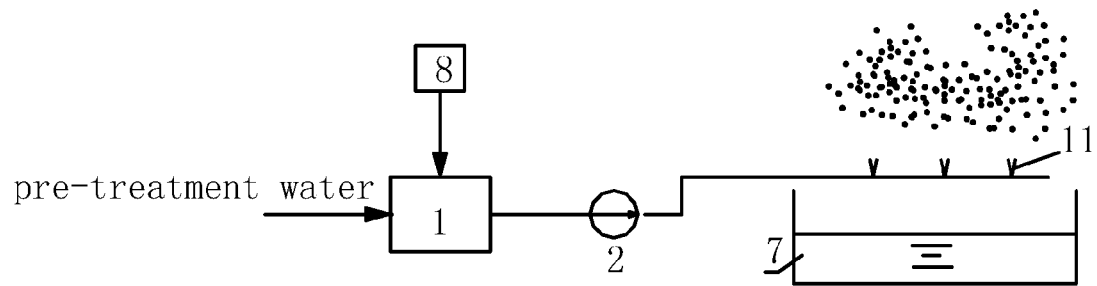

This application is a continuation of International Patent Application No. PCT/CN2006/002359 with an international filing date of Sep. 12, 2006, designating the United States, now pending, and further claims priority benefits to Chinese Patent Application No. 200510019781.X filed Nov. 11, 2005. The contents of these specifications are incorporated herein by reference.

BACKGROUND OF THE INVENTION

1. Field of the Invention

The invention relates to a highly effective method for removing and separating ammonia nitrogen from solutions.

2. Description of the Related Art

A number of industries produce ammonia waste, including ammonia plants in the petrochemical industry, coking plants in the steel industry, and fertilizer plants in the agrochemical industry. Ammonia is a dangerous water pollutant that adversely affects human health. Accordingly, much research has been focused on the development of methods for removal of ammonia from solutions.

These methods include microbial degradation, steam stripping, gas stripping, ion exchange, adsorption, electrolysis, membrane separation, precipitation, oxidation, breakpoint chlorination, wet oxidation, etc. Most of these methods work well in theory but in practice suffer from high operational cost and difficult implementation. Only the first three of the methods listed above, i.e., microbial degradation, steam stripping, and gas stripping, are used commercially, as illustrated below.

| Category | Concentration (mg/L) | Flow rate ($m^3$/h) | Conventional treatment method | Efficiency | Operational cost | Typical industry |
|---|---|---|---|---|---|---|
| High | >10000 | 0-100 | Steam stripping | Good | High | Ammonia plants |
| Mid-high | 200-10000 | 0-500 | Gas stripping | Low; very low at low temperatures | High | Ammonia plants; Catalyst factories |
| Low | <200 | 0-1000 and up | Biological degradation | Good | Low | Sewage treatment plants |

Ammonia nitrogen at high concentrations is amenable to steam stripping. Based on the difference in solubility at different temperatures, ammonia present in high concentrations is removed from the liquid phase by increasing solution temperature by means of steam. Meanwhile, ammonia is recycled or converted into ammonium salt generating revenue.

Ammonia nitrogen at low concentrations (mainly domestic sewage at 30-50 mg/L) is usually removed via biological methods. However, with the increase of $NH_3$—N concentration, the operational cost increases significantly. For example, since 4.73 kg of $O_2$ is theoretically required for removing 1 kg of ammonia nitrogen (while only 0.7-1.2 kg of $O_2$ is required for removing 1 kg of $BOD_5$), oxygen must be supplied by an air diffuser or an air fan, increasing energy consumption.

When $NH_3$-N in waste water increases to about 70 mg/L, a carbon source concentration of 280 mg/L is required for removal of ammonia, while the BOD of regular domestic sewage is 150-250 mg/L. Therefore, extra carbon source (such as methanol) is required, which results in significant increase in operating costs. Hence, biological treatment works well only on $NH_3$-N concentration of less than 100 mg/L. It should be pointed that when the $NH_3$-N concentration is greater than 150 mg/L, the growth of common microbes is inhibited, which leads to poor removal of ammonia.

Mid-high concentration of ammonia often comes in waste water from waste leachate, and the petrochemical industry. There is no economical and effective conventional method of treatment for this type of waste water. If steam stripping is used, steam consumption is high relative to the value of recycled ammonia; if biological methods are employed, implementation is difficult and impracticable. Therefore, the gas stripping method is commonly used as the lesser of two evils.

The stripping method used to remove soluble ammonia from aqueous solutions is exemplified in FIG. 1. An external gas (carrier gas) is fed into a stripping tower where it passes against finely dispersed particles of ammonia-containing solution. In this way the gas-liquid interface is increased and soluble ammonia transfers from the liquid phase into the gas phase. Air is usually used as the carrier gas and the pH value of the ammonia-containing solution is adjusted to about 11 or higher by adding an alkali base, so as to convert ammonium ions ($NH_4^+$) dissolved in water to $NH_3$ molecules. In the stripping tower, the aqueous solution is dispersed into small droplets or water mist, $NH_3$ from the liquid phase is transferred into gas phase, and then carried away from the stripping tower with the carrier gas introduced by a blower.

The stripping tower is equipped with a packing layer having a certain height. Ammonia-containing solution is sprayed from the top of the tower, and flows downward along a surface of the packing. Air is blown from the bottom of the tower up, and continuously contacts with the solution. The disadvantages of the stripping method are include low efficiency (40-60% at normal temperature), and high operating cost due to the need to frequently replace the packing and clean the tower. Moreover, in winter when the temperature is low, the stripping method has very low removal efficiency due to a higher solubility of ammonia in colder water. Heating of waste water to remove ammonia in this process is not economical.

Since the gas-to-water ratio in the gas-stripping method is high, the energy consumption for this process is also relatively high. Normal cost for the gas stripping method of removal of ammonia nitrogen is about 1.5 USD or above per cubic meter. In addition, the concentration of residual ammonia nitrogen in waste water from which ammonia was removed by the gas stripping method is between 200-500 mg/L, and does not meet the discharge standard. Therefore, further treatment is often necessary.

GB Pat. Appl. Publ. No. GB2383034A describes a method for treating liquid containing ammonia, comprising the following steps: spraying an alkaline liquid from the center of a cylindrical vessel in the shape of an umbrella, allowing the water stream to hit the walls of the vessel, forcing air or nitrogen to flow in a tangential direction to the vessel walls, so as to form a cylindrical gas-liquid interface, allowing the gas to discharge from the top of the vessel, and the liquid to flow out downwardly from the bottom of the vessel. The GB application publication particularly emphasizes that the gas stream must enter in a tangential direction to form a spiral shape, and the vessel must be a cylinder without any obstacles therein.

However, the method does not use highly-dispersed micrometer- or nanometer-sized liquid particles. The nozzle of the stripping tower usually uses a reflective-I type, a reflective-II type or any other low water pressure nozzle with a water pressure of approximately 1 kg/cm$^2$. To enlarge the gas-liquid contact surface, the stripping method relies on the generation of a liquid film (the liquid is liquid film or liquid drops with comparatively large particles instead of small particles), and the gas and the liquid form eddies in the cylinder to increase the contact surface. The efficiency is low and the operational costs are high.

SUMMARY OF THE INVENTION

One objective of the invention is to provide a highly dispersive method and device for removing ammonia nitrogen from solution, which feature high removal efficiency, low cost, and infrequent maintenance.

In one embodiment, the method for removing ammonia nitrogen from solution comprises: a) adjusting the pH of the ammonia-containing solution to above 10 by adding a base; b) atomizing the ammonia-containing solution to produce an ammonia-containing mist so as to increase the gas-liquid interface and allow ammonia to transfer from the ammonia-containing mist to an ambient gas yielding a clean mist; and c) re-aggregating the clean mist.

Figure 4:
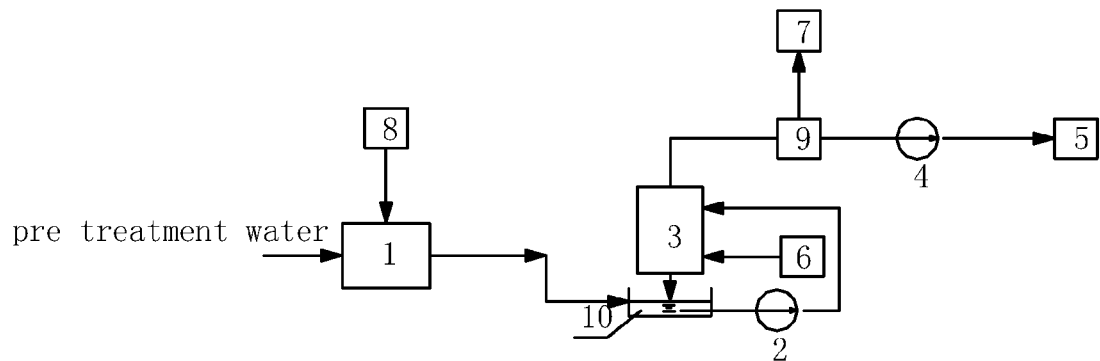

In a class of this embodiment, the pH value of the solution is adjusted to 10 or above with a base (such as calcium hydroxide, sodium hydroxide, etc.), and after being mixed and compressed, the solution is dispersed into a spray or mist via a liquid atomizer or a nozzle.

In a class of this embodiment, the particle size of the spray or mist is on the order of microns or nanometers.

In a class of this embodiment, the smaller the size of dispersed particles, the higher the removal efficiency. Any type of liquid atomization technique can be used as long as the solution is dispersed into micro-sized or nano-sized particles.

In a class of this embodiment, the process or a portion thereof is implemented in open air or in a vessel.

In a class of this embodiment, when the process or a portion thereof is implemented in a vessel, a carrier gas is additionally introduced to force out of the vessel ammonia transferred from the ammonia-containing mist to ambient gas, or removing ammonia transferred from the ammonia-containing mist to ambient gas out of the vessel by using vacuum. The externally-supplied gas has the function of forcing separated $NH_3$ particles to flow out of the system. The gas may be nitrogen, or any other suitable gas.

In a class of this embodiment, when the process or a portion thereof is implemented in open air, natural wind flow accelerates the transfer of ammonia from the liquid phase to the gas phase.

In a class of this embodiment, the position of the atomizer or the nozzle of the atomization device in the air or the atomization chamber, the angle of spraying may be freely adjusted as required to maximize efficiency.

In a class of this embodiment, multiple atomizers or nozzles may be employed.

In a class of this embodiment, the base is $Ca(OH)_2$.

BRIEF DESCRIPTION OF THE DRAWINGS

FIG. 1 is a schematic diagram illustrating a gas stripping method of the prior art;

FIG. 2 is a process flow chart illustrating a method of removing ammonia nitrogen according to one embodiment of the invention;

FIG. 3 is a schematic diagram of the method of removing ammonia nitrogen where atomization is directly implemented in the air according to another embodiment of the invention;

FIG. 4 is a flowchart illustrating a method of removing ammonia nitrogen according to another embodiment of the invention;

FIG. 5 is a schematic diagram of the method of removing ammonia nitrogen where atomization is directly implemented in the air according to another embodiment of the invention;

FIG. 6(1) is a process flow chart illustrating a method of removing ammonia nitrogen according to one embodiment of the invention wherein another kind of gas is utilized in the atomization chamber;

FIG. 6(2) is a process flow chart illustrating a method of removing ammonia nitrogen according to one embodiment of the invention employing vacuum atomization chamber;

FIG. 7 illustrates one design of a vacuum atomization chamber used in the methods of the invention;

FIG. 8 illustrates another design of a vacuum atomization chamber used in the methods of the invention;

FIG. 9 illustrates yet another design of a vacuum atomization chamber used in the methods of the invention;

FIG. 10 illustrates still further design of a vacuum atomization chamber used in the methods of the invention;

FIG. 11 is illustrates one design of an atomizing nozzle used in the methods of the invention; and FIG. 12 is a process flow chart illustrating a method of removing ammonia nitrogen according to yet another embodiment of the invention.

DETAILED DESCRIPTION OF THE INVENTION

Preferred embodiments of the invention will now be described in connection with FIGS. 2-12. Referring specifically to FIG. 2, in a process flowchart of a method for removing ammonia from a solution, the following elements are employed: 1—adjustment of the pH value of a solution; 2—pressure pump; 3—atomization chamber; 4—air-induction device; 5—post treatment of gas containing ammonia; 6—air, $N_2$, or other gas medium; 7—clean solution, 8—base; 9—gas-liquid separation.

The configuration of the pressure pump 2 depends on the working condition so as to ensure a certain pressure of the solution flowing into the atomization chamber.

Based on the concentration of ammonia-nitrogen in the solution to be treated and treating requirements, the atomization chamber 3 can be set to one or multiple levels.

FIG. 3 is a flowchart of atomization implemented in open air in a scenario where $NH_3$ is emitted in the air. In FIG. 3, 11 indicates a nozzle.

FIG. 4 illustrates another embodiment of a method for removing ammonia from a solution. The adjustment of the pH value 1 may be performed in a solution circulating pool 10. The method is applicable for a condition where water flows in and out discontinuously. In FIG. 4, 10 indicates the solution circulating pool.

Figure 5:
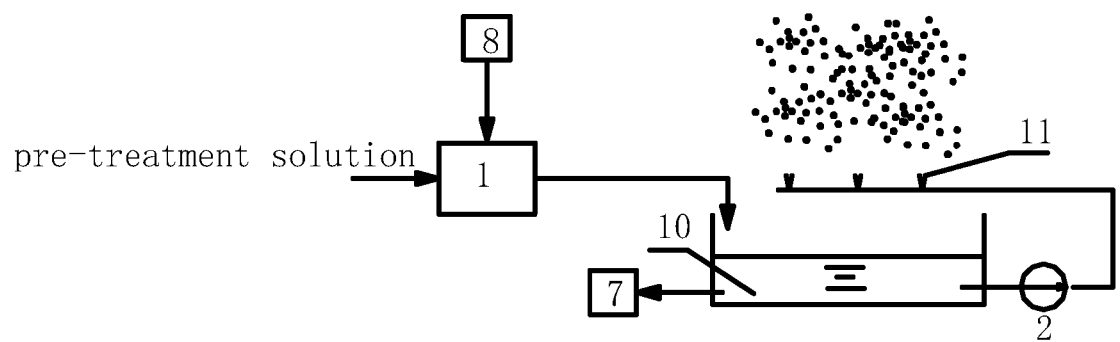

FIG. 5 is another flowchart of atomization implemented in open air combined with adjusting of pH in a solution circulating pool 10. The method is applicable for a condition where water flows in and out discontinuously.

Figure 6:
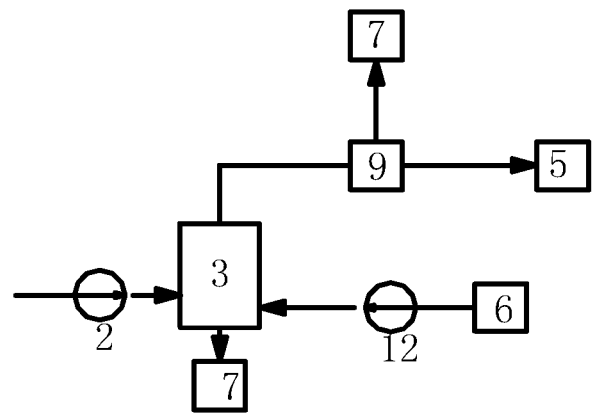
Figure 6:
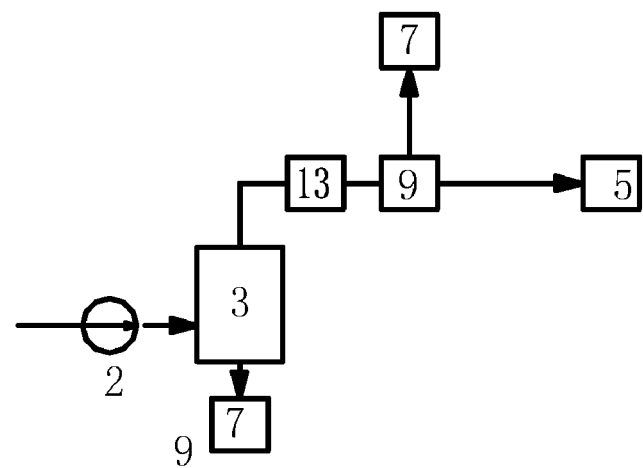
Figure 7:
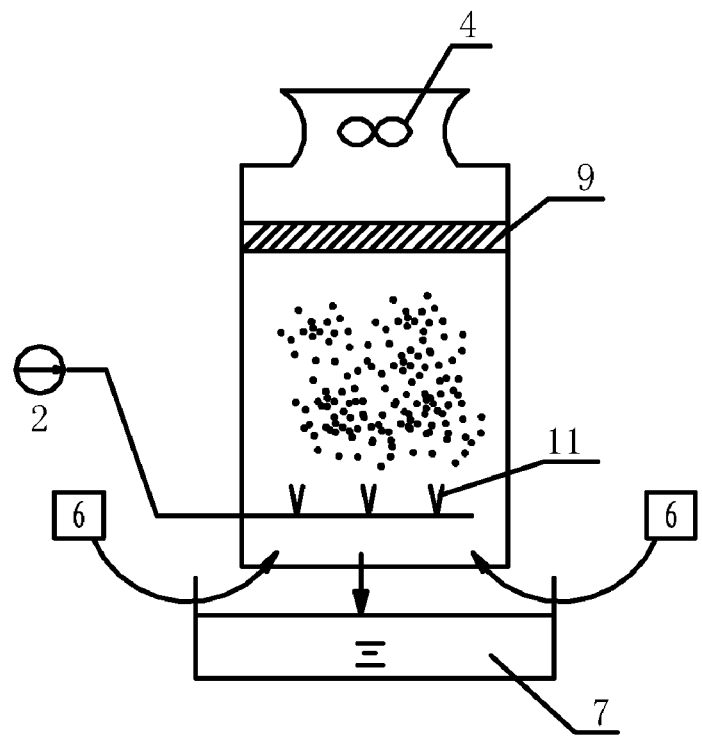
Figure 8:
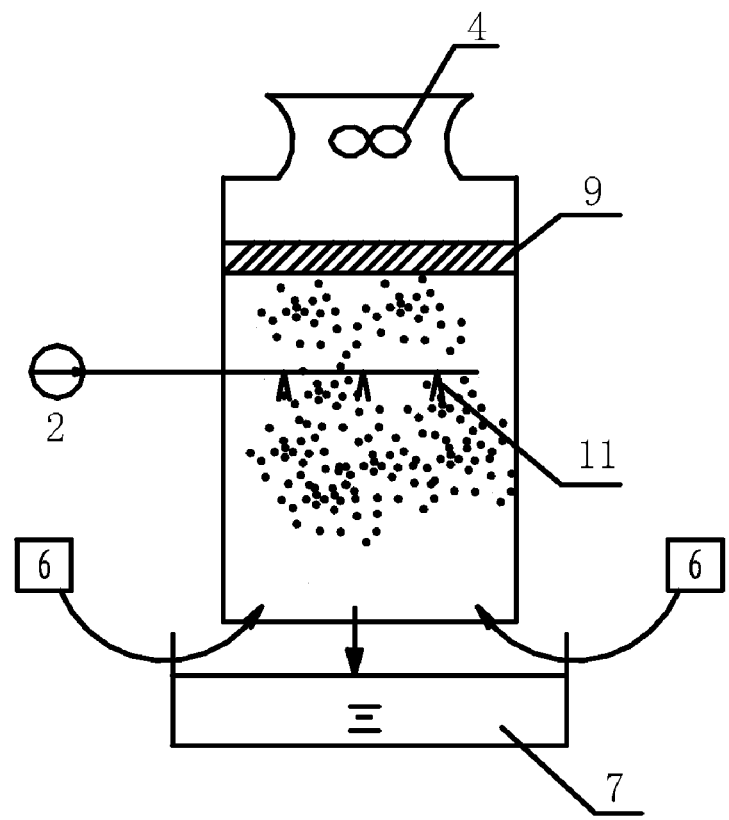
Figure 9:
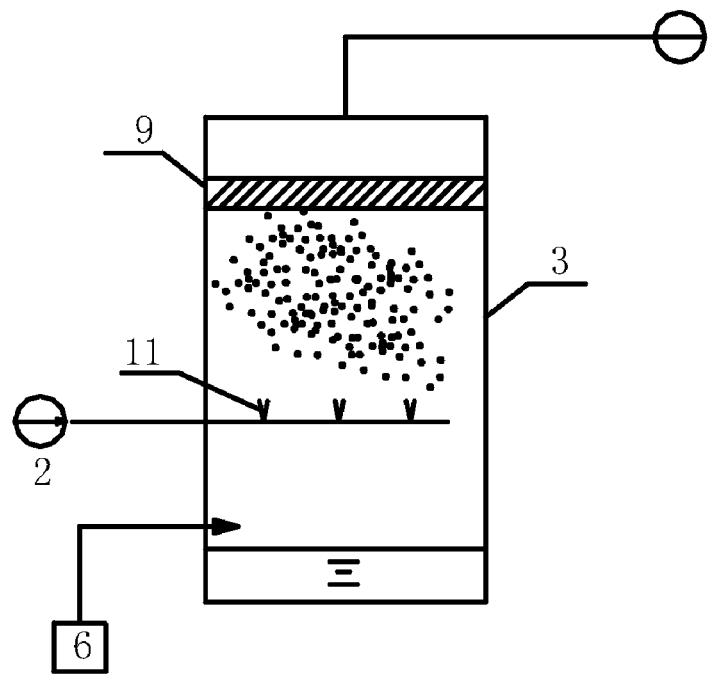
Figure 10:
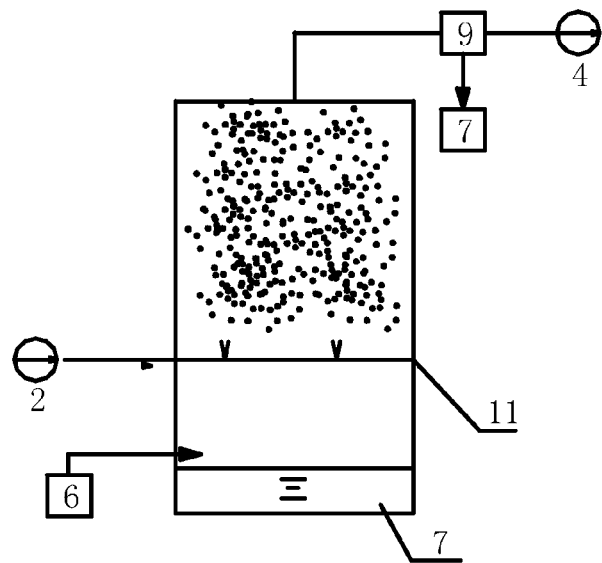

Referring to FIGS. 6(1) and 6(2), 12 indicates a blowing device, and 13 indicates a vacuum pump. The blowing device 12 supplies carrier gas to the atomization chamber 3 by blowing. Alternatively, carrier gas is passed through the atomization chamber 3 by means of vacuum pump 13.

Figure 11:
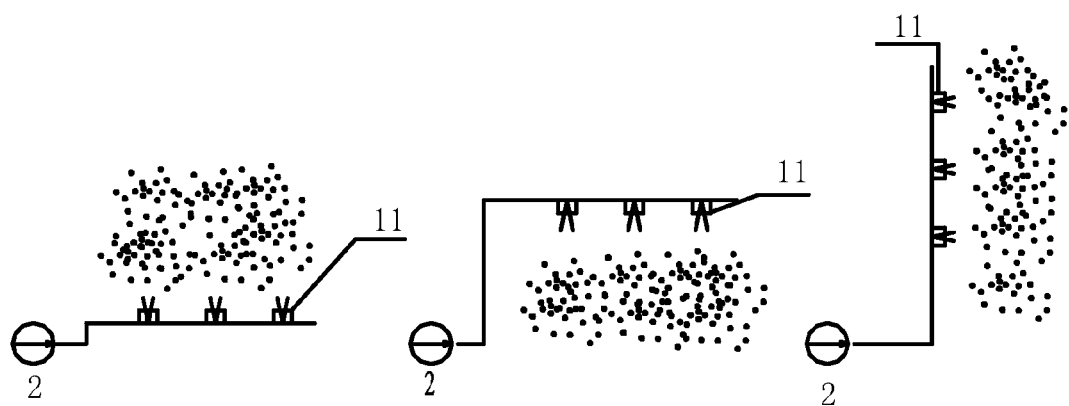
Figure 12:
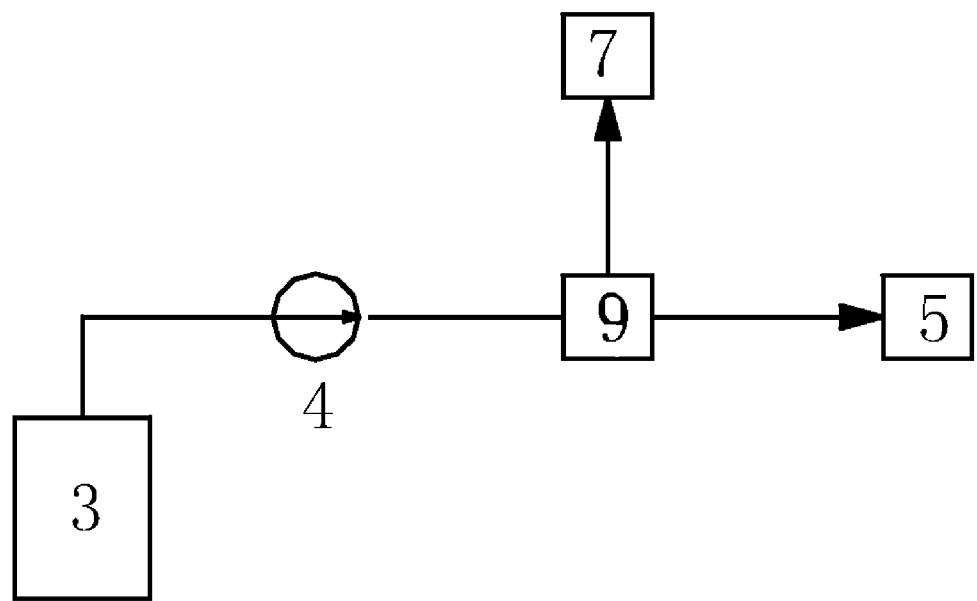

FIGS. 7-10 illustrate various alternative designs of the atomization chamber 3. Referring to FIG. 11, the atomizing nozzle may be oriented upward, downward, sideways, and any other direction. Referring to FIG. 12, another embodiment for implementing gas-liquid separation is shown.

Implementing the apparatus and methods of the invention overcomes difficulties encountered in prior art.

Firstly, the invention has good applicability, is applicable to solutions with high, medium and low ammonia nitrogen concentration, and is capable of directly reducing ammonia nitrogen to meet an emission standard without using any other method.

Secondly, the removal efficiency of the method at any concentration of ammonia nitrogen is high.

Thirdly, unlike the gas stripping method which has low removal efficiency at lower temperatures (e.g., in winter), the method of this invention has no restrictive requirement on temperature.

Fourthly, the treatment process of the invention is simple and easily applied commercially.

Finally, the cost of operation is low. The base accounts for a large portion of cost. In the stream stripping method and the gas stripping method, the base is usually NaOH instead of $Ca(OH)_2$ (cost of the latter is ⅓ than that of the former) due to problems caused by $Ca(OH)_2$ such as block of packing in the tower and so on.

It was discovered in connection with this invention that better efficiency is obtained if $Ca(OH)_2$ is used to adjust the pH value.

Initially, the $NH_3$ in the solution is prone to escape from a liquid surface and transfer to the gas phase, and finally steady state is realized, namely the rate at which $NH_3$ transfers from the aqueous to the gas phase is the same as that from the gas phase to the aqueous phase.

In an unsteady state, the rate of $NH_3$ transfer to the gas phase depends on the temperature of liquid, nitrogen pressure in the gas phase, and the gas-liquid contact area. As the temperature is constant, escape of $NH_3$ may speed up by decreasing nitrogen pressure in the gas phase and increasing the gas-liquid contact area. That is, to improve the removal efficiency, the overall area of liquid per unit volume must be increased; and the nitrogen pressure in the gas phase should be decreased. Since fast transfer of $NH_3$ to the gas phase is effectively implemented, less gas is consumed, and higher efficiency is obtained.

The higher the dispersion is, the larger the surface area is, the more $NH_3$ escapes, and the higher the removal efficiency will be. The invention disperses liquid into micro-graded or nano-graded dewdrops in the atomization chamber as required and enables gas to quickly flow through, thus $NH_3$ on the surface of the mist quickly transfers into the gas phase and nitrogen is removed.

Gas-liquid separation may be further performed on the gas-liquid mixture. After separation, post-treatment of gas containing $NH_3$ may employ techniques known in the art, and a post-treatment method for gas containing $NH_3$ may be utilized.

EXAMPLES

Detailed description of the invention will be given below, but the invention is not to be limited to the following embodiments.

Example 1

Ammonia Nitrogen Removal Using Steam Stripping of Prior Art

Waste water from a chemical factory contained ammonia nitrogen at a concentration of $3.29\times10^3$ mg/L. If $Ca(OH)_2$ were used, the packing tower would be easily be blocked, therefore after NaOH was used to raise the pH value, steam was heated to 45° C. and then the waste water was treated by stripping two times. The total removal efficiency was less than 50%. Calculated operating cost were comparatively high and the treated water still did not meet the national emission standard. Therefore, the treated water was mixed with and diluted by waste water containing less ammonia nitrogen, and was transmitted to a municipal wastewater treatment plant for treating via biological methods.

Example 2

Ammonia Nitrogen Removal Using Methods of this Invention

Waste water from the above-mentioned plant was processed using methods of the invention. The treatment conditions were: water temperature 15° C., the lift of the pump 45 m, the flow rate 2.8 $m^3$/h, the power 550 W; type of the nozzle WFCS-0.5-90-304SS, 0.5 T/h, the fan characteristics were: air volume 1000 $m^3$/h, air pressure 700 Pa, power 250 W. To water sample of 25 kg 200 g of calcium oxide was added, raising the pH value to 12. A second treatment was performed after the first treatment, the ammonia nitrogen concentration was reduced to 47 mg/L. The removal efficiency of 99% was reached and the treatment cost was approximately ¼-½ that of the steam stripping method.

Example 2

Ammonia Nitrogen Removal Using Methods of this Invention

Conditions were similar to those in Example 2, except that the water temperature was 19° C., and ammonia nitrogen concentration was $3.30\times10^3$ mg/L. Calcium oxide was added to adjust the pH value to 13. A small atomizer was used and the waste water was processed in open air. The ammonia nitrogen concentration after the first treatment was 445 mg/L, the removal efficiency was 86.6%, and the water temperature was reduced to 17° C. After a second treatment, the ammonia nitrogen concentration is reduced to 54 mg/L, and the overall removal efficiency was 98.3%.

Example 3

Ammonia Nitrogen Removal Using Methods of this Invention

Conditions were similar to those in Example 2, except that water temperature was 20° C., and the waste water was diluted for ammonia nitrogen concentration to reach 53.0 mg/L. Calcium oxide was added, and the pH value was adjusted to 12. A small atomizer was used. The ammonia nitrogen concentration of the solution after spraying in open air was reduced to 9.0 mg/L, which meets the national standard. The removal efficiency was 85%.

Example 4

Ammonia Nitrogen Removal Using Methods of this Invention

Conditions were similar to those in Example 2, except that water temperature was 19° C., and the ammonia nitrogen concentration is 210 mg/L. Calcium oxide was added to the waste water to adjust the pH value to 10. A small sprayer was used and spaying processing is performed in open air. The ammonia nitrogen concentration after first pass was 82 mg/L. The removal efficiency was 61%. After a second treatment, the ammonia nitrogen concentration was reduced to 46 mg/L, and the overall removal efficiency was 78%.

What is claimed is:

1. A method for removing ammonia nitrogen from an ammonia-containing solution, comprising a) adjusting the pH of the ammonia-containing solution to above 10 by adding a base;

b) atomizing the ammonia-containing solution to produce an ammonia-containing mist so as to increase the gas-liquid interface and allow ammonia to transfer from the ammonia-containing mist to a gas yielding a clean mist; and c) re-aggregating said clean mist.

2. The method of claim 1, wherein the ammonia-containing mist is prepared with an atomizer or a nozzle.

3. The method of claim 1, wherein the ammonia-containing mist comprises liquid particles having a particle size on the order of micrometers or nanometers.

4. The method of claim 1, wherein the atomizing of the ammonia-containing solution in b) is performed in open air or in a vessel; and if the atomizing of the ammonia-containing solution in b) is performed in a vessel, additionally introducing a carrier gas to force out of the vessel ammonia transferred from the ammonia-containing mist to the ambient gas, or removing said ammonia transferred from the ammonia-containing mist to the ambient gas out of the vessel by using vacuum.

5. The method of claim 2, wherein the atomizing of the ammonia-containing solution in b) is performed in open air or in a vessel; and if the atomizing of the ammonia-containing solution in b) is performed in a vessel, additionally introducing a carrier gas to force out of the vessel ammonia transferred from the ammonia-containing mist to the ambient gas, or removing said ammonia transferred from the ammonia-containing mist to the ambient gas out of the vessel by using vacuum.

6. The method of claim 3, wherein the atomizing of the ammonia-containing solution in b) is performed in open air or in a vessel; and if the atomizing of the ammonia-containing solution in b) is performed in a vessel, additionally introducing a carrier gas to force out of the vessel ammonia transferred from the ammonia-containing mist to the ambient gas, or removing said ammonia transferred from the ammonia-containing mist to the ambient gas out of the vessel by using vacuum.

7. The method of claim 1, wherein said base is $Ca(OH)_2$.

8. The method of claim 2, wherein said base is $Ca(OH)_2$.

9. The method of claim 3, wherein said base is $Ca(OH)_2$.

10. A method for removing ammonia nitrogen from an ammonia-containing liquid, comprising admixing $Ca(OH)_2$ to the ammonia-containing liquid; and atomizing the resultant solution.

* * * * *